(12) United States Patent
Wang et al.

(10) Patent No.: US 9,798,216 B2
(45) Date of Patent: Oct. 24, 2017

(54) 2D/3D SWITCHABLE STEREOSCOPIC DISPLAY APPARATUS

(71) Applicant: SuperD Co. Ltd., Shenzhen (CN)

(72) Inventors: Honglei Wang, Shenzhen (CN); Fuzhong Guo, Shenzhen (CN); Xiaoda Gong, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 124 days.

(21) Appl. No.: 14/849,686

(22) Filed: Sep. 10, 2015

(65) Prior Publication Data

US 2015/0378240 A1 Dec. 31, 2015

Related U.S. Application Data

(63) Continuation of application No. PCT/CN2015/082042, filed on Jun. 23, 2015.

(30) Foreign Application Priority Data

Jun. 24, 2014 (CN) .......................... 2014 1 0289749

(51) Int. Cl.
*G09G 3/34* (2006.01)
*H04N 13/04* (2006.01)
*G02F 1/29* (2006.01)
*G02B 27/22* (2006.01)

(52) U.S. Cl.
CPC ............. *G02F 1/29* (2013.01); *G02B 27/225* (2013.01)

(58) Field of Classification Search
CPC ........ H04N 13/00; H04N 13/04; H04N 13/02; G02F 1/133; G02F 1/29; G02B 27/22; A61B 1/04; G09G 3/34
See application file for complete search history.

(56) References Cited

U.S. PATENT DOCUMENTS

| 2010/0195203 A1* | 8/2010 | Zuidema | G02B 3/005 359/463 |
| 2011/0157499 A1* | 6/2011 | Lee | G02B 3/08 349/15 |
| 2012/0120333 A1* | 5/2012 | Chen | G02B 3/14 349/33 |
| 2012/0218490 A1* | 8/2012 | Takama | G02B 3/005 349/57 |
| 2012/0243204 A1* | 9/2012 | Robinson | G02B 27/225 362/19 |
| 2014/0267959 A1* | 9/2014 | Yang | G02B 27/22 349/15 |

* cited by examiner

*Primary Examiner* — Pegeman Karimi
(74) *Attorney, Agent, or Firm* — Anova Law Group, PLLC (57) ABSTRACT

A 2D/3D switchable stereoscopic display apparatus includes a display panel, a liquid crystal lens, and a controller. The liquid crystal lens includes a first substrate having a plurality of first electrodes, a second substrate disposed opposite to the first substrate and having a second electrode, a liquid crystal layer constituting liquid crystal molecules disposed between the first substrate and the second substrate, and a plurality spacers. The controller is configured to, when the display apparatus is in a 2D display state, control a first voltage between the first electrodes and the second electrode to generate a first electric field with an equal electric field intensity, which causes the liquid crystal molecules to rotate by a predetermined degree such that a refractive index difference between the liquid crystal molecules and the spacers is within a preset range.

18 Claims, 5 Drawing Sheets

2D/3D SWITCHABLE STEREOSCOPIC DISPLAY APPARATUS

CROSS-REFERENCES TO RELATED APPLICATIONS

This application is a continuation application of PCT patent application number PCT/CN2015/082042, filed on Jun. 23, 2015, which claims the priority of Chinese patent application number CN201410289749.2, filed on Jun. 24, 2014, the entire contents of all of which are incorporated herein by reference.

FIELD OF THE INVENTION

The present disclosure generally relates to the display technologies and, more particularly, to a 2D/3D switchable stereoscopic display apparatus.

BACKGROUND

People can perceive the depth of an object by a small difference between the image of the object viewed by the right eye and the image of the object viewed by the left eye, thereby recognizing a stereoscopic or three-dimensional (3D) image. This difference is called parallax. Thus, in general, the 3D display technologies create parallax between the viewer's left and right eyes through artificial means, and send the two view images with the parallax to the left eye and the right eye, respectively. After receiving the different images viewed by the left eye and the right eye, the viewer's brain produces the perception of a real 3D object.

Figure 1:
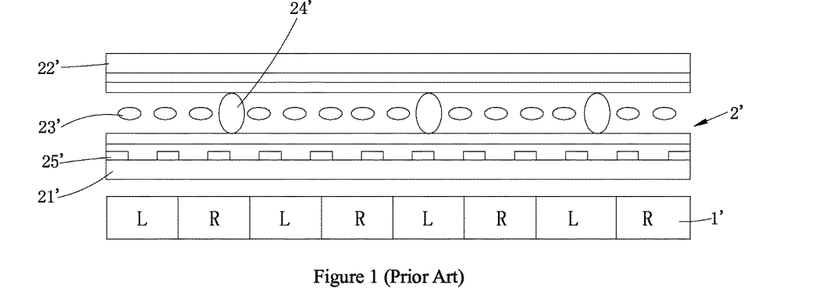
FIG. 1 is an existing full resolution stereoscopic display apparatus.

With people's evolving understanding of the liquid crystal materials, liquid crystal lenses made of liquid crystal materials are used in a wide range of applications, such as 3D display applications. FIG. 1 shows an existing 2D/3D switchable stereoscopic display apparatus.

As shown in FIG. 1, the conventional 2D/3D switchable stereoscopic display apparatus includes a display panel 1' and a liquid crystal lens 2' provided on the light-emitting side of the display panel 1'. Light emitted from the display panel 1' passes through the liquid crystal lens 2' and enters into the viewer's left and right eyes, respectively, to achieve 3D display.

The liquid crystal lens 2' comprises a first substrate 21' and a second substrate 22', disposed in opposite of each other, a liquid crystal layer comprising liquid crystal molecules 23' and disposed between the first substrate 21' and the second substrate 22', and spacers 24' supporting the thickness of the liquid crystal layer. The spacers are made of transparent materials.

Further, a plurality of first electrodes 25' are configured on the first substrate 21', and a second electrode is configured on the second substrate 22'. When the 2D/3D switchable display apparatus is used for 3D display, driving voltages are applied between the plurality of first electrode 25' and the second electrode to form a plurality of liquid crystal lens units to realize 3D display. When the 2D/3D switchable stereoscopic display apparatus is in the 2D display state, no driving voltages are applied between the plurality of first electrode 25' and the second electrode. As the light emitted from the display panel 1' passes through the spacer 24' and the liquid crystal molecules 23' surrounding the spacers 24', because the refractive index difference between the refractive index of the spacers 24' and the refractive index of the liquid crystal molecules 23' is relatively large, the light may be refracted at the spacers 24'. Thus, when the viewer is viewing the liquid crystal lens 2', bright spots or colored spots may appear at the spacer 24', impacting the viewing effect and comfortableness.

Other conventional existing 3D display apparatus often include a display panel and a liquid crystal lens grating. The display panel includes a plurality of pixels and a black matrix disposed among the plurality of pixels, and the liquid crystal lens grating includes spacers. The positions of the spacers may correspond to the positions of the black matrix in the display panel, but the black matrix often cannot fully cover the spacers. Thus, the bright-spot problem of the spacers may affect the display effect of the display panel.

The disclosed device and method are directed to solve one or more problems set forth above and other problems.

BRIEF SUMMARY OF THE DISCLOSURE

One aspect of the present disclosure includes a 2D/3D switchable stereoscopic display apparatus. The display apparatus includes a display panel, a liquid crystal lens, and a control module. The liquid crystal lens is coupled with the display panel at a light-emitting side of the display panel, and the liquid crystal lens includes a first substrate having a plurality of first electrodes, a second substrate disposed opposite to the first substrate and having a second electrode, a liquid crystal layer constituting liquid crystal molecules disposed between the first substrate and the second substrate, and a plurality spacers. The control module is configured to, when the display apparatus is in a 2D display state, control a first voltage between the first electrodes and the second electrode to generate a first electric field with an equal electric field intensity, which causes the liquid crystal molecules to rotate by a predetermined degree such that a refractive index difference between the liquid crystal molecules and the spacers is within a preset range.

Another aspect of the present disclosure includes a method for a 2D/3D switchable stereoscopic display apparatus. The display apparatus includes a display panel, a control module, and a liquid crystal lens coupled with the display panel at a light-emitting side of the display panel. The liquid crystal lens includes a first substrate having a plurality of first electrodes, a second substrate disposed opposite to the first substrate and having a second electrode, a liquid crystal layer constituting liquid crystal molecules disposed between the first substrate and the second substrate, and a plurality spacers. The method includes obtaining a display state of the display apparatus; determining whether the display state is a 2D display state or a 3D display state; and, when it is determined that the display state is a 2D display state, controlling a first voltage between the first electrodes and the second electrode to generate a first electric field with an equal electric field intensity, which causes the liquid crystal molecules to rotate by a predetermined degree such that a refractive index difference between the liquid crystal molecules and the spacers is within a preset range.

Other aspects of the present disclosure can be understood by those skilled in the art in light of the description, the claims, and the drawings of the present disclosure.

DETAILED DESCRIPTION

To illustrate the technical problems and solutions, various embodiments are described in detail below with the accompanying drawings. It should be understood that the disclosed embodiments are for illustrative purposes and not intended to limit the present invention.

Reference will now be made in detail to exemplary embodiments of the invention, which are illustrated in the accompanying drawings. Wherever possible, the same reference numbers will be used throughout the drawings to refer to the same or like parts.

Figure 2:
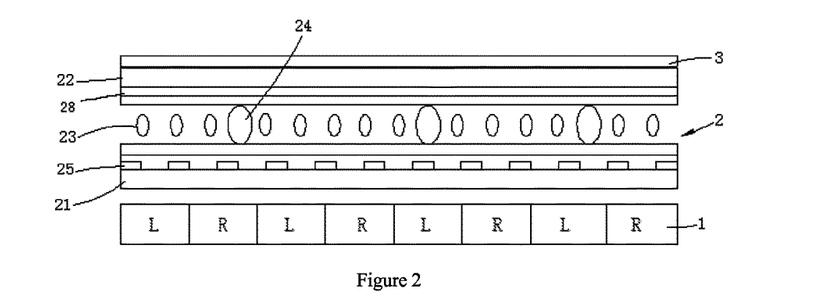
FIG. 2 illustrates an exemplary 2D/3D switchable stereoscopic display apparatus consistent with disclosed embodiments.

FIG. 2 illustrates an exemplary 2D/3D switchable stereoscopic display apparatus consistent with the disclosed embodiments. As shown in FIG. 2, the 2D/3D switchable stereoscopic display apparatus includes a display panel 1 and liquid crystal lens 2, where the liquid crystal lens 2 is coupled with the display panel 1 on the light-emitting side of the display panel 1.

The liquid crystal lens 2 includes a first substrate 21 and a second substrate 22, disposed opposite to each other, and the second substrate 22 is located above the first substrate 21. Further, a liquid crystal layer comprising liquid crystal molecules 23 is placed between the first substrate 21 and second substrate 22, and the spacers 24 are also placed between the first substrate 21 and second substrate 22 to maintain space and thickness of the liquid crystal layer. A plurality of first electrode 25 are provided on the first substrate 21, with any adjacent two first electrodes 25 being spaced apart at a predetermined distance, and at least one second electrode 28 is provided on the second substrate 22.

More specifically, each of the first electrode 25 may be a stripe-shaped electrode, such as a straight line, a curved line, a zig-zag line, etc., or any other shape based on the actual needs. Similarly, a plurality of second electrodes 28 may also be provided on second substrate 22, with any adjacent two second electrodes 28 being spaced apart at a predetermined distance. Further, similar to the first electrodes 25, each second electrode 28 may also be a stripe-shaped electrode, such as a straight line, a curved line, or a zig-zag line, etc. The second electrode 28 may also be in other shape, such as a plane electrode. When both of the first electrodes 25 and the second electrodes 28 are stripe-shaped electrodes, the first electrodes 25 and the second electrodes 28 may be arranged in parallel, or may be arranged crossing each other, or may even be perpendicular to each other.

Figure 13:
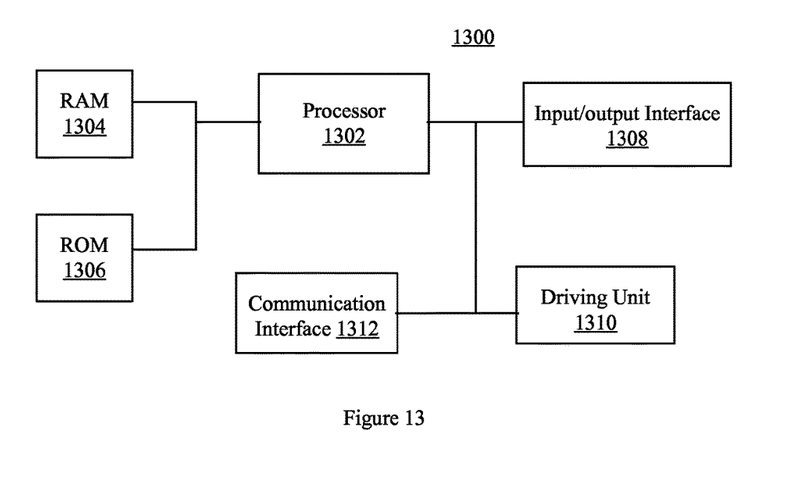
FIG. 13 illustrates an exemplary control module consistent with disclosed embodiments.

Further, the 2D/3D switchable stereoscopic display apparatus also includes a control module. FIG. 13 illustrates an exemplary control module. As shown in FIG. 13, control module 1300 may include a processor 1302, a random access memory (RAM) unit 1304, a read-only memory (ROM) unit 1306, an input/output interface unit 1308, a driving unit 1310, and a communication interface 1312. Other components may be added and certain devices may be removed without departing from the principles of the disclosed embodiments.

Processor 1302 may include any appropriate type of graphic processing unit (GPU), general-purpose microprocessor, digital signal processor (DSP) or microcontroller, and application specific integrated circuit (ASIC), etc. Processor 1302 may execute sequences of computer program instructions to perform various processes associated with the display apparatus. The computer program instructions may be loaded into RAM 1304 for execution by processor 1302 from read-only memory 1306 to process various 3D images.

Input/output interface 1308 may be provided for users to input information into the display apparatus or for the users to receive information from the display apparatus. For example, input/output interface 1308 may include any appropriate input device, such as a remote control, a keyboard, a mouse, an electronic tablet, a voice communication device, or any other optical or wireless input device. Further, driving unit 1310 may include any appropriate driving circuitry to drive various devices, such as the various electrodes.

Further, communication interface 1312 may provide communication connections such that control module 1300 may be accessed by and/or communicate with other processors or systems through computer networks or other communication links via various communication protocols, such as transmission control protocol/internet protocol (TCP/IP) and hypertext transfer protocol (HTTP).

Returning to FIG. 2, when the 2D/3D switchable stereoscopic display apparatus is in a 2D display state, the control module may control to apply a first voltage between the first substrate 21 and the second substrate 22, and the first voltage generates a first electric field (not shown) with an equal electric field intensity (or a uniform electric field intensity). The first electric field drives the liquid crystal molecules 23 to rotate at a same degree, so that the difference between the refractive index of the liquid crystal molecules 23 and the refractive index of the spacers 24 is within a preset range. For example, when the difference between the refractive index of the liquid crystal molecules 23 and the refractive index of the spacers 24 is less than 0.1, such difference may be within the preset range, and the refractive index of the liquid crystal molecules 23 is considered as close to the refractive index of the spacers 24.

That is, as shown in FIG. 2, when the 2D/3D switchable stereoscopic display apparatus is used for 2D display, the control module controls the first voltage applied between the first substrate 21 and the second substrate 22. The first voltage 21 generates the first electric field with a uniform electric field intensity between the first substrate 21 and the second substrate 22. Under the effect of the first electric field, all the liquid crystal molecules 23 are rotated at a same degree, i.e., the liquid crystal molecules 23 having the same refractive index, and the difference between the refractive index of the liquid crystal molecules 23 and the refractive index of the spacers 24 is within the preset range. As such, the refractive index of the liquid crystal molecules 23 is considered as close to the refractive index of the spacers 24.

Thus, when light emitted from the display panel 1 passes through the liquid crystal molecules 23 and the spacer 24, the light is not substantially refracted (i.e., the light is not refracted or, even if the light is still refracted, the amount of refraction is negligible). Therefore, the bright-spot problem of existing 2D/3D switchable stereoscopic display apparatus can be resolved, i.e., when used in the 2D display state, the light may be refracted at the spacer due to the difference between the refractive index of the liquid crystal molecules and the refractive index of the spacers. At the same time, because the refractive index of the liquid crystal molecules 23 and the refractive index of the spacers 24 is within the preset range, the light is not refracted when passing the spacers 24, avoiding the light leakage phenomenon.

The preset range may refer to a range of refractive index difference between the refractive index of the liquid crystal molecules 23 and the refractive index of the spacers 24 set in advance, such as 0.1. The refractive index difference between the liquid crystal molecules 23 and the spacers 24 may be adjusted by the control module by adjusting the driving voltages to change the degree of rotation of the liquid crystal molecules 23, and the adjustment may be done in advance or in real time. By using the first electric field with a uniform electric field intensity to drive the liquid crystal molecules 23 to rotate at a same degree, such that the refractive index difference between the liquid crystal molecules 23 and the spacers 24 is substantially small, within the preset range. Thus, the bright-spot or color-spot problem of existing 2D/3D switchable stereoscopic display apparatus can be resolved, i.e., when used in the 2D display state, the light may be refracted at the spacer due to the difference between the refractive index of the liquid crystal molecules and the refractive index of the spacers to impact the display effect.

More specifically, when the 2D/3D switchable stereoscopic display apparatus in in the 2D display state, the control module applies an equal or similar first driving voltage on each of the plurality of first electrodes 25, and applies a second driving voltage on the second electrode. The difference between the first driving voltage and the second driving voltage is the first voltage, and the first voltage generates the first electric field with an equal or uniform electric field intensity. Under the effect of the first electric field, the refractive index difference between the liquid crystal molecules 23 and the spacers 24 is within the preset range, i.e., the refractive index of the liquid crystal molecules 23 is substantially close to the refractive index of the spacers 24. The bright-spot phenomenon of the spacers can be prevented, without impacting on the display effect of the 2D/3D switchable stereoscopic display apparatus or the light leakage phenomenon.

Further, in the 2D/3D switchable stereoscopic display apparatus, the first voltage may be greater than the threshold voltage $v_{th}$ of the liquid crystal molecules 23. Such first voltage generates the first electric field with a uniform electric field intensity, and the liquid crystal molecules 23 are rotated at a same degree under the effect of the first electric field with a uniform electric field intensity. Thus, the refractive index difference between the liquid crystal molecules 23 and the spacer 24 is substantially small, within the preset range. Thus, when the light emitted from the display panel 1 passes through the spacers 24, the light is not substantially refracted (i.e., the light is not refracted or, even if the light is still refracted, the amount of refraction is negligible), preventing the bright-spot phenomenon of the spacers.

In certain embodiments, the threshold voltage of the liquid crystal molecules 23 is $v_{th}$, the first voltage is $u_0$, and $1.5v_{th} \leq u_0 \leq 4v_{th}$. At room temperature, the threshold voltage $v_{th}$ of the liquid crystal molecules 23 is about 2.6 V. Thus, the first voltage is greater than the threshold voltage $v_{th}$ of the liquid crystal molecules 23 to ensure that, under the effect of the first electric field with a uniform electric field intensity, all the liquid crystal molecules 23 of the liquid crystal lens 2 rotate at a same degree, such that the refractive index difference between the liquid crystal molecules 23 and the spacers 24 is within the preset range. Thus, not only the right-spot problem of the spacers due to the refractive index difference between the liquid crystal molecules and the spacers can be solved, but also the display effect of the 2D/3D switchable stereoscopic display apparatus is not impacted.

In certain embodiments, the first voltage can be set to $3.5V \leq u_0 \leq 8V$, such that the first voltage $u_0$ is greater than the threshold voltage $v_{th}$ of the liquid crystal molecules 23. Thus, under the effect of the first electric field with a uniform electric field intensity, the refractive index difference between the liquid crystal molecules 23 and the spacers 24 is within the preset range. When the light emitted from the liquid crystal lens 2 passes through the spacers 24, the light is not refracted at the spacers 24, eliminating the bright-spot the phenomenon at the spacers 24.

Further, as shown in FIG. 2, the 2D/3D switchable stereoscopic display apparatus also includes a directional diffuser 3 for directionally diffusing the light emitted from the liquid crystal lens 2. The directional diffuser 3 may be a directional light-diffusing device mounted on the light-emitting side of the liquid crystal lens 2. Thus, the light emitted from the liquid crystal lens 2 can enter the directional diffuser 3 to be further diffused. The diffused light may be spatially-distributed within the visual field of the viewer's eyes, improving the viewing effect and viewing comfort of the 2D/3D switchable stereoscopic display apparatus in the 2D display state or in the 3D display state.

Further, the directional diffuser 3 may further reduce the bright-spot problem of the spacers when the 2D/3D switchable stereoscopic display apparatus is in the 2D display state. That is, even when a small degree of refraction happens due to the small refractive index difference between the liquid crystal molecules 23 and the spacers 24, the directional diffuser 3 can diffuse the light emitted from the liquid crystal lens 2, further reducing the bright-spot phenomenon of the spacers 24.

Figure 3:
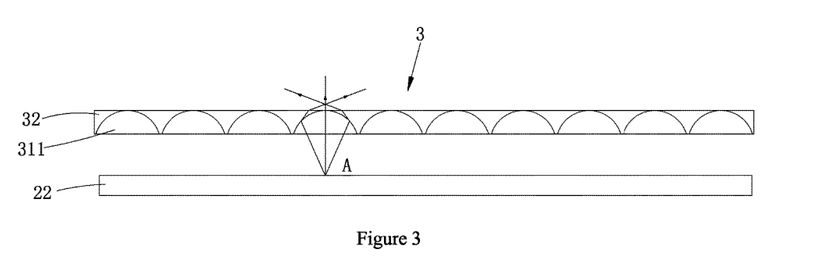
FIG. 3 illustrate a light propagation path of an exemplary direction diffuser consistent with the disclosed embodiments.

Because the directional diffuser 3 has a simple structure, the directional diffuser 3 can be easily installed on the surface of the liquid crystal lens 2. For example, as shown in FIG. 3, the top surface of the second substrate 22 may be coated with a layer of industrial glue, which can glue or fix the directional diffuser 3 on the second substrate 22. Further, when the directional diffuser 3 is installed on the surface of the second substrate 22, it should be ensured that the focal length of the directional diffuser 3 is greater than or less than the thickness of the industrial glue layer, so that the light-emitting position of the liquid crystal lens 2 is not on the focal point of the directional diffuser 3. Thus, the directional diffuser 3 can diffuse the light from the liquid crystal lens 2, further reducing or eliminating the bright-spot or color-spot phenomenon of the spacers 24. Other assembly methods may also be used, such as using snap-fit connection or screw connection, to mount the directional diffuser 3 on the light-emitting side of the liquid crystal lens 2.

The directional diffuser 3 may include any appropriate type of diffusers, such as a diffusion sheet/plate with directional diffusing functionality, an optical diffusion film, a lens, a light-guide sheet/plate, a dichroic prism or other optical device, etc., which may be easily accessible, lowering the product cost. By adding the directional diffuser 3 to a 2D/3D switchable stereoscopic display apparatus, not only the viewing effect of the 2D/3D switchable stereoscopic display apparatus can be improved, but also the product cost is little increased, improving the market competitiveness of the 2D/3D switchable stereoscopic display apparatus. Of course, the directional diffuser 3 may also be a liquid crystal lens structure, with variable focal length, to provide directional diffusion on the light emitting from the liquid crystal lens 2.

In certain other embodiments, when the spacers 24 distributed evenly in the liquid crystal lens 2, the structure of the directional diffuser 3 can be simplified. For example, the directional diffuser 3 may be a layer covering the spacers 24, but the directional diffuser 3 only has light-diffusion structures at locations corresponding to the spacers 24, while at locations other than the spacers 24, the directional diffuser 3 is made of materials having the same refractive index as the substrate 22. Thus, the directional diffuser 3 only directionally diffuse the light emitting from spacers 24, and does not diffuse light passing through other locations of the liquid crystal lens 2. That is, the viewer can view the light passing through the liquid crystal lens 2 from regions other than the spacers 24 without diffusion, and can view the light passing through the liquid crystal lens 2 from the spacers 24 with diffusion, further reducing the bright-spot problem of the spacers.

Figure 11:
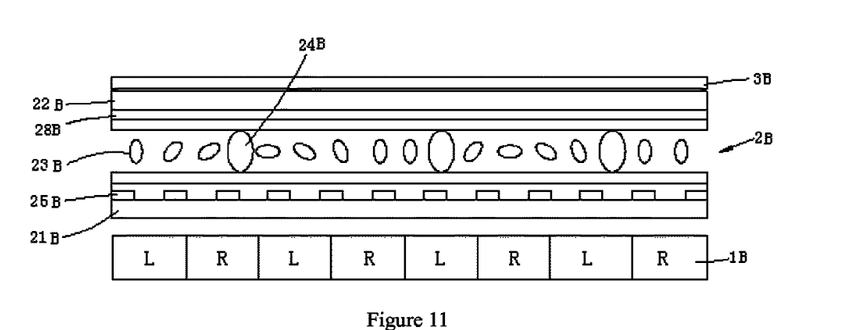
FIG. 11 illustrates another exemplary 2D/3D switchable stereoscopic display apparatus consistent with disclosed embodiments.

FIG. 11 illustrates an exemplary 2D/3D switchable stereoscopic display apparatus is in the 3D display state. As shown in FIG. 11, in operation, when the 2D/3D switchable stereoscopic display apparatus is in the 3D display state, the control module controls a second voltage (or a plurality of second voltages) between a first substrate 21B and a second substrate 22B. The second voltage generates a second electric field with an unequal or non-uniform electric field intensity. Under the effect of the second electric field, the liquid crystal molecules 23B rotates differently according to different electric field intensity in the second electric field, such that the refractive index of the liquid crystal layer between the first substrate 21B and the second substrate 22B is distributed in gradient, forming an array of liquid crystalline lens units.

Specifically, each of the plurality of first electrodes 25B is applied with a third driving voltage, and the second electrode 28B is applied with a fourth driving voltage, and the difference between the third driving voltage and the fourth driving voltage is the second voltage. The second voltage generates the second electric field with an unequal electric field intensity. That is, the second voltage is not a single voltage, but is used to differentiate the voltage differences applied between the first electrodes and the second electrode(s), in terms relative to the first voltage. Specifically, the second voltage may include an array of voltage groups, with each group having a plurality of voltages in gradient distribution. These array of voltage groups can cause an array of liquid crystal lens units to be formed.

When the 2D/3D switchable stereoscopic display apparatus is in the 3D display state, the liquid crystal molecules 23B rotate at different degrees under the effect of the second electric field to form the array of liquid crystalline lens units. In addition, after the liquid crystal molecules 23B rotate at different degrees, the refractive index difference between the liquid crystal molecules 23B and the spacers 24B is within the preset range. That is, in this state, the refractive index of the liquid crystal molecules 23B is substantially close to the refractive index of the spacers 24B, reducing the bright-spot phenomenon of the spacers.

For example, the locations of the spacers 24B and the rotations of the liquid crystal molecules 23B over the spacers 24B may be configured correspondingly such that the refractive index difference between the liquid crystal molecules 23B over the spacers 24B and the spacers 24B is within the preset range.

Further, a directional diffuser 3B may be placed on the light-emitting side of the liquid crystal lens 2B, further reducing or eliminating the bright-spot phenomenon of the spacers.

Thus, in operation, the display panel 1B provides at least a left view image and a right view image, and the directional diffuser 3B is placed on the liquid crystal lens 2B, with an angle against the liquid crystal lens 2B. When the light passes through the liquid crystal lens 2B and enters the directional diffuser 3B, the directional diffuser 3B directionally diffuses the light, such that the diffused light (even when refracted slightly before entering the directional diffuser 3B) enters the left and right eyes of the viewer, still in the standard left view image and right view image. Thus, the viewer can view a normal 3D image based on the left view image and right view image.

Based on different display states of the 2D/3D switchable stereoscopic display apparatus, the control module can control the first voltage and/or the second voltage between the first substrate 21 and the second substrate 22, without affecting the normal display when the 2D/3D switchable stereoscopic display apparatus is in the 3D display state. Further, the control module also controls the directional diffuser 3B to further solving the bright-spot problem of the spacers when the 2D/3D switchable stereoscopic display apparatus is in the 3D display state.

Figure 4:
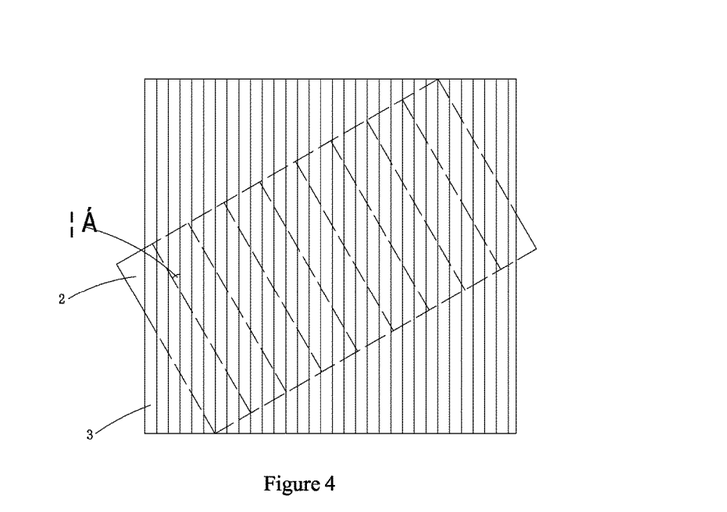
FIG. 4 illustrates an exemplary arrangement of a directional diffuser and a liquid crystal lens consistent with disclosed embodiments.

Further, as shown in FIG. 4, the directional diffuser 3 and the liquid crystal lens 2 are arranged at a predetermined angle. The angle between the directional diffuser 3 and the liquid crystal lens 2 may allow light to exit from the liquid crystal lens 2 normally when in the 3D display state. In certain embodiments, a predetermined range of degrees of the angle may be configured, such that when the angle between the directional diffuser 3 and the liquid crystal lens 2 is within the predetermined range of degrees, the directional diffuser 3 can diffuse the light emitted from the liquid crystal lens 2. At the same time, such angle may also ensure that the light can exit from the liquid crystal lens 2 normally when the 2D/3D switchable stereoscopic display apparatus is in the 3D display state, and passes through the directional diffuser 3 without affecting the 3D display effect.

In certain embodiments, the angle between the directional diffuser 3 and the liquid crystal lens 2 is $\alpha$, and $60° \leq \alpha \leq 120°$. When the directional diffuser 3 is configured with the angle within the predetermined range, the directional diffuser 3 can diffuse the light exited from the liquid crystal lens 2. Also, the angle $\alpha$ should be set to ensure that the light can exit from the liquid crystal lens 2 normally when the 2D/3D switchable stereoscopic display apparatus is in the 3D display state, and passes through the directional diffuser 3 without affecting the 3D display effect.

Thus, in operation, the display panel 1 provides at least a left view image and a right view image, and the directional diffuser 3 is placed on the liquid crystal lens 2, with an angle against the liquid crystal lens 2. When the light passes through the liquid crystal lens 2 and enters the directional diffuser 3, the directional diffuser 3 directionally diffuses the light, such that the diffused light enters the left and right eyes of the viewer, as standard left view image and right view image. Thus, the viewer can view a normal 3D image based on the left view image and right view image.

In one embodiment, the angle α between the directional diffuser 3 and the liquid crystal lens 2 is: α=90°, i.e., the diffusion direction is perpendicular to the direction of the light emitting the liquid crystal lens 2. The directional diffuser 3 can directionally diffuse the light emitted from the liquid crystal lens 2, such that the directional diffuser 3 does not affect the viewing effect when the 2D/3D switchable stereoscopic display apparatus is in the 3D display state.

Figure 5:
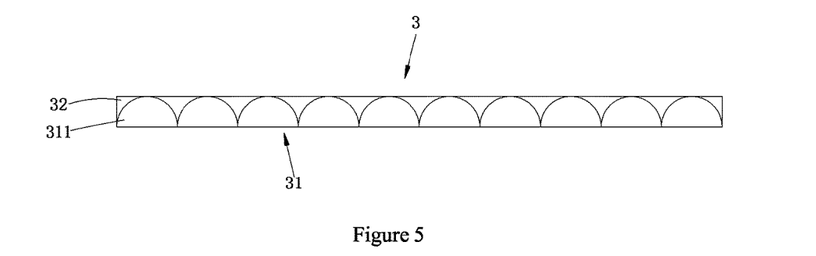
FIG. 5 illustrates an exemplary directional diffuser consistent with disclosed embodiments.

Further, the directional diffuser 3 may include any appropriate type of optical diffusing devices. FIGS. 5-8 illustrate various exemplary directional diffusers. As shown in FIG. 5, the directional diffuser 3 may include a first refraction layer 31 and a second refraction layer 32 covering the first refraction layer 31, with a refractive index difference between the first refraction layer 31 and the second refraction layer 32. The first refraction layer 31 may include a plurality of diffusion units 311 arranged in an array, and the height of the directional diffuser 3 is greater than or equal to the height of the diffusion units 311.

Because the refractive index of the first refraction layer 31 and the refractive index of the second refraction layer 32 is different, when the light emitted from the liquid crystal lens 2 passes through the second substrate 22 into the directional diffuser 3, the light is refracted at the boundary of the diffusion unit 311 and, when the light exits the directional diffuser 3, the light is again refracted at the boundary of the second refraction layer 32. That is, the light is refracted twice in the directional diffuser 3 before entering into eyes of the viewer. Thus, the light is further spatially expanded or distributed within the entire viewing field, improving the bright-spot phenomenon of the spacers 24.

Further, when the light enters the first refraction layer 31, because the diffusion units 311 are arranged in an array, the light refracted by the diffusion units 311 can be more evenly distributed. As shown in FIG. 5, when the height of the directional diffuser 3 is equal to the height of the diffusion units 311, the light is refracted only once at the highest point of the diffusion unit 311, improving light emission ratio of the liquid crystal lens 2.

Figure 6:
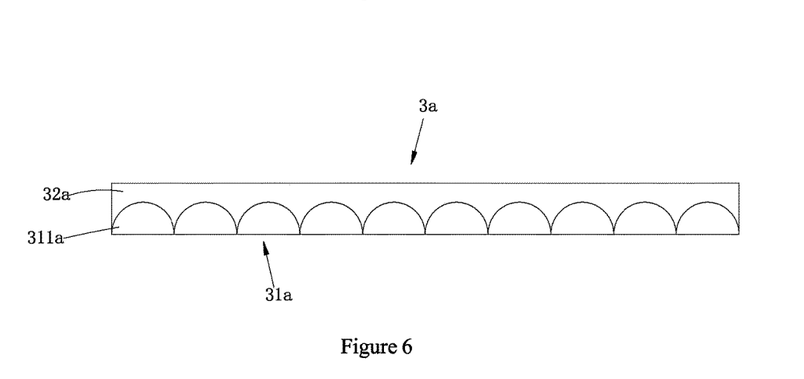
FIG. 6 illustrates another exemplary directional diffuser consistent with disclosed embodiments.

As shown in FIG. 6, the directional diffuser 3*a* includes a first refraction layer 31*a* and a second refraction layer 32*a*, and the first refraction layer 31*a* includes a plurality of diffusion units 311*a* arranged in an array. When the height of the directional diffuser 3*a* is greater than the height of the diffusion units 311*a*, the light is refracted twice when passing through the directional diffuser 3*a*. That is, when the light enters into the directional diffuser 3*a*, the light first enters into the diffusion units 311*a*, and is refracted first at the boundary of the diffusion units 311*a* between the first refraction layer 31*a* and the second refraction layer 32*a*. The refracted light enters into the second refraction layer 32*a*, and is again refracted at the boundary of the second refraction layer 32*a* between the second refraction layer 32*a* and air, before reaching the viewer's eyes.

Thus, when setting up the directional diffuser 3 in the 2D/3D switchable stereoscopic display apparatus, the height of the directional diffuser 3 is set a desired value. If the height of the directional diffuser 3 is too large, the light emission ratio of the liquid crystal lens 2 may be reduced. In one embodiment, the height of the directional diffuser 3 is set to approximately 15~80 mm larger than the height of diffusion units 311, eliminating the bright-spot problem of the spacers without affecting the light emission ratio of the liquid crystal lens 2.

Further, as shown in FIG. 3, light emitting point A of the liquid crystal lens 2 (or the second substrate 22) is not at the focal point of the diffusion units 311. Thus, as shown in FIG. 2, the directional diffuser 3 is coupled to the liquid crystal lens 2 to diffuse the light emitting from the liquid crystal lens 2. Specifically, the diffusion units 311 in the directional diffuser 3 diffuse the light emitting from the liquid crystal lens 2. The focal length of the diffusion units 311 is configured in such a way that the light emitting point A on the second substrate 22 of the liquid crystal lens 2 is not at the focal point of the diffusion units 311. Thus, the light emitting from the liquid crystal lens 2 is refracted by the diffusion units 311 and diffused. The diffusion caused the light to be further spatially expanded or distributed within the entire viewing field, improving the bright-spot phenomenon of the spacers 24.

It should be noted that FIG. 3 only illustrates the optical path and propagation in certain embodiments, and the distance between the light emitting position A and the diffusion unit 311 does not represent the actual distance.

In certain embodiments, as shown in FIG. 2, FIG. 3, and FIG. 6, the focal length of the diffusion units 311 is f, the distance between the light emitting point A and the diffusion unit 311 is l, and l≤0.5f or l>2f. Because the 2D/3D switchable stereoscopic display apparatus may require a desired light emission ratio for the liquid crystal lens 2, the focal length of the diffusion units 311 should not be too large. Further, because the directional diffuser 3 can be installed on the liquid crystal lens 2 using industrial glue, the focal length of the diffusion units 311 should be greater than or less than the distance between the second substrate 22 and the first refraction layer 31, i.e., the focal length of the diffusion units 311 is greater than or less than the thickness of the industrial glue layer, to ensure that the light emitting position A of the liquid crystal lens 2 is not on the focal point of the diffusion units 311. Thus, when the light emitted from the liquid crystal lens 2 enters into the directional diffuser 3, the light is further spread, making the light more diffused or dispersed.

In certain embodiments, the diffusion element 311 may be a concave lens or a convex lens, the directional diffuser 3 a combination of lenses with different refractive indices. The diffusion element 311 may also have any appropriate type of cross-sectional shape. As shown in FIG. 5, the cross-sectional shape of the diffusion unit 311 is a curve. When the light exited from the liquid crystal lens 2 enters the directional diffuser 3, the light is refracted at the boundary of the diffusion units 311.

Figure 7:
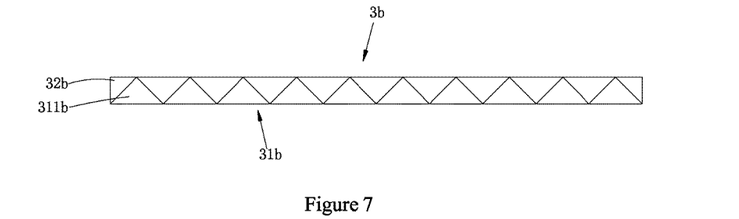
FIG. 7 illustrates another exemplary directional diffuser consistent with disclosed embodiments.

Alternatively, as shown in FIG. 2 and FIG. 7, the directional diffuser 3*b* includes the first refraction layer 31*b* and the second refraction layer 32*b*, and the first refraction layer 31*b* includes a plurality of diffusion units 311*b* arranged in an array. The cross-sectional shape of the diffusion unit 311*b* is a triangle, and the height of the directional diffuser 3*b* is the same as the height of the diffusion units 311*b*. When the light passes through the directional diffuser 3*b*, the light is refracted the boundary of the diffusion units 311*b*.

Figure 8:
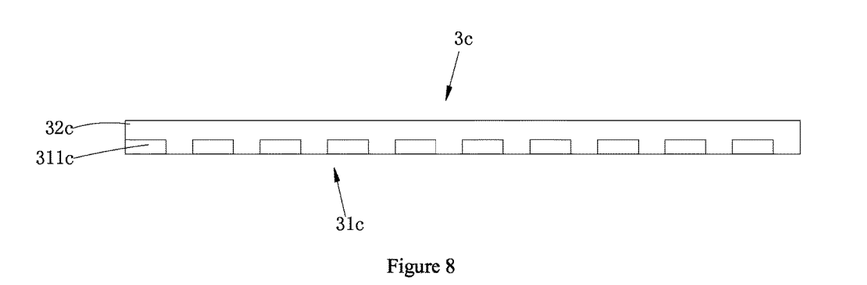
FIG. 8 illustrates another exemplary directional diffuser consistent with disclosed embodiments.

Alternatively, as shown in FIG. 2 and FIG. 8, the directional diffuser 3c includes the first refraction layer 31c and the second refraction layer 32c, and the first refraction layer 31c includes a plurality of diffusion unit 311c arranged in an array. The cross-sectional shape of the diffusion unit 311c is a rectangle, and the height of the directional diffuser 3c is greater than the height of the diffusion units 311c. When the light passes through the directional diffuser 3c, the light is refracted the boundary of the diffusion units 311c and the boundary of the second refraction layer 32c.

Of course, the cross-sectional shape of the diffusion unit 311 may be other regular or irregular shape for achieving the refractive functionality. For example, as shown in FIG. 2 and FIG. 3, the cross-sectional shape of the diffusion unit 311 is a semi-circle. The regular shape of the cross-sectional shape of the diffusion unit 311 may make it easy for production and for reducing product cost. At the same time, the diameter of the diffusion unit 311 is smaller than the diameter of the liquid crystal lens unit, such that each liquid crystal lens unit can correspond to multiple diffusion units 311. Thus, when the light emitted from the liquid crystal lens 2 enters into the diffusion units 311, the light is further spread, making the light more diffused or dispersed, further reducing the bright-spot phenomenon of the spacers.

In certain embodiments, as shown in FIG. 2 and FIG. 3, the diameter d of the diffusion units 311 is ⅓~⅔ times of the diameter of the spacers 24. When the 2D/3D switchable stereoscopic display apparatus is in the 2D display state, the control module controls the first voltage applied between the first substrate 21 and the second substrate 22, and the first voltage generates the first electric field with a same or uniform electric field intensity. Under the effect of the first electric field, the refractive index difference between the liquid crystal molecules 23 and the spacers 24 is within the preset range. However, under certain circumstance, even when the refractive index of the liquid crystal molecules 23 is close to the refractive index of the spacers 24, when the light emitted from the display panel 1 passes through the spacers 24, a small amount of light may be refracted at the spacers 24. In such case, the directional diffuser 3 can further refract the light emitted from the liquid crystal lens 2 at the light diffusion units 311, further reducing the bright-spot phenomenon of the spacers 24. The diameter d of the diffusion units 311 is smaller than the diameter of the spacers 24 to ensure the light emitted from the liquid crystal lens 2 is diffused.

Further, as shown in FIG. 5, the height of the directional diffuser 3 is equal to the height of the diffusion units 311, and the height h of the diffusion unit 311 may be set as:

$$h = f - \sqrt{f^2 - \left(\frac{d}{2}\right)^2},$$

where the cross-sectional shape of the diffusion unit 311 is a semi-circle, f is the focal length of the diffusion unit 311, and d is the diameter of the diffusion unit 311. That is, the height of the diffusion unit 311 may be determined by the focal length of the diffusion unit 311 and the diameter of the diffusion unit 311. Based on the height h, the focal length f, and the diameter d, the diffusion units 311 can be manufactured. Because such structure of the diffusion units 311 is simple, it is relatively easy to manufacture.

Further, as shown in FIG. 2 and FIG. 5, the refractive index of the first refraction layer 31 is $N_1$, the refractive index of the second refraction layer 32 is $N_2$, and the refractive index difference between the first refraction layer 31 and the second refractive layer 32 is $\Delta n = |N_1 - N_2| \geq 0.1$. In certain embodiments, candidates for the refractive indices may include n=1.46, 1.51, 1.59, 1.60, etc. Other values may also be used.

Figure 9:
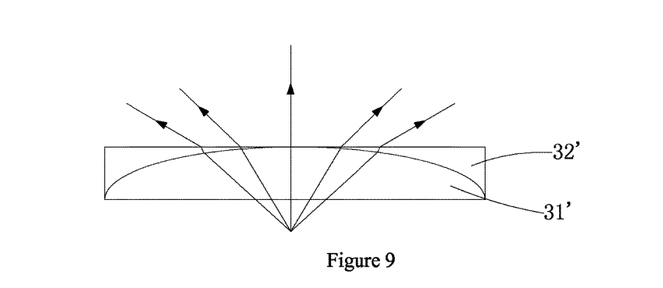
FIG. 9 illustrates a light propagation path of an exemplary diffusion unit consistent with disclosed embodiments.
Figure 10:
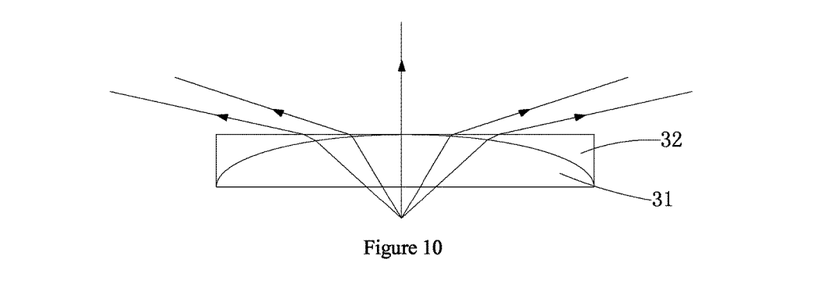
FIG. 10 illustrates a light propagation path of another exemplary diffusion unit consistent with disclosed embodiments.

FIG. 9 and FIG. 10 illustrate optical path diagrams of exemplary diffusion units with different refractive indices. For example, as shown in FIG. 2 and FIG. 9, refractive index $N_1$ of the first refraction layer 31' is approximately 1.59, and the refractive index $N_2$ of the second refraction layer 32' is approximately 1.60. Thus, the refractive index difference between the first refraction layer 31' and the second refraction layer 32' can be obtained, and the optical path of light passing through the first refraction layer 31' and the second refraction layer 32' of the liquid crystal lens 2 can be determined, as shown in FIG. 9.

As shown in FIG. 3 and FIG. 10, refractive index $N_1$ of the first refraction layer 31 is approximately 1.46, and the refractive index $N_2$ of the second refraction layer 32 is approximately 1.60. Thus, the refractive index difference between the first refraction layer 31 and the second refraction layer 32 can be obtained, and the optical path of light passing through the first refraction layer 31 and the second refraction layer 32 of the liquid crystal lens 2 can be determined, as shown in FIG. 10.

Thus, it can also been seen that, while the 2D/3D switchable stereoscopic display apparatus provides normal display, the larger the refractive index difference $\Delta n$ between the first refraction layer 31 and the second refraction layer 32, the more desired the diffusion functionality of the directional diffuser 3, i.e., making the light more diffused or dispersed, further reducing the bright-spot phenomenon of the spacers.

In certain embodiments, as shown in FIG. 2 and FIG. 5, the first refraction layer 31 may be made of a first OCA (optically clear adhesive) optical glue or a first UV (ultraviolet) glue, and the second refraction layer 32 may be made of a second UV glue or a second OCA optical glue.

OCA or Optically Clear Adhesive is a type of special adhesive for adhering transparent optical components, such as lenses, etc., and also possesses various characteristics, such as colorless and transparent, more than 90% of light transmittance, having desired bonding strength, able to being cured at room temperature or mid-range temperature, and little curing shrinkage, etc.

The UV glue is also known as shadowless glue, photoresist, or UV curing adhesive, etc., a type of adhesive that needs to be cured by ultraviolet light irradiation. The UV glue can be used as a binding glue, and can also be used as glue material in paints, coatings, inks, etc. use. The UV glue curing principle is that the photoinitiators (or photosensitizers) in UV-curable materials, under the UV irradiation, produce reactive free radicals or cationic after absorbing ultraviolet light, causing chemical reactions, such as monomer, crosslinking and branching, to change the adhesive agent from liquid to solid within a few seconds.

More specifically, when making the directional diffusers, the first refraction layer 31 may be made of the first OCA optical glue, and the second refraction layer 32 may be made of a second OCA optical glue or a second UV glue having a refractive index different from the first refraction layer 31. Or, the first refraction layer 31 may be made of the first UV glue, and the second refraction layer 32 may be made of a second OCA optical glue or a second UV glue having a refractive index different from the first refraction layer 31. To ensure that the directional diffuser 3 is fixedly mounted on the liquid crystal lens 2, industrial glue is used between the directional diffuser 3 and the liquid crystal lens 2, i.e., fixing the directional diffuser 3 using a glue layer. Because the OCA optical glue and UV glue have good adhesiveness, the adhesive bonding with the industrial glue is more solid, without affecting light emission of the liquid crystal lens 2.

In certain embodiments, the first OCA optical glue, the second OCA optical glue, the first UV glue, and the second UV glue may all include resin. Resin, as a commonly used chemical products, is easy to obtain, and easy to be bond together with the second substrate 22, improving operation.

Specifically, the main body of the first OCA optical glue, the second OCA optical glue, the first UV glue, and the second UV glue may be resin. The main body of the first OCA optical glue and the second OCA optical glue may be acrylic resin, unsaturated polyester resin, polyurethanes, or epoxy resins. For example, the main body of the first OCA optical glue may be unsaturated polyester resin, and the main body of the second OCA optical glue may be polyurethanes. Because the composition of the first OCA optical glue and the second OCA optical glue is different, the refractive index of the first OCA optical glue is different from the refractive index of the second OCA optical glue.

Similarly, the main body of the first UV glue and the second UV glue may be epoxy(meth)acrylate, and may also be urethane(meth)acrylates or silicone(meth)acrylates. For example, the main body of the first UV glue may be epoxy(meth)acrylate, and the main body of the second UV glue may be polyurethane(meth)acrylate. Because the composition of the first UV glue and the second UV glue is different, the refractive index of the first UV glue is different from the refractive index of the second UV glue.

Thus, by configuring the composition of the first OCA optical glue, the second OCA optical glue, the first UV glue, and the second UV glue, refractive index difference can be maintained among the first OCA optical glue, the second OCA optical glue, the first UV glue, and the second UV glue.

Figure 12:
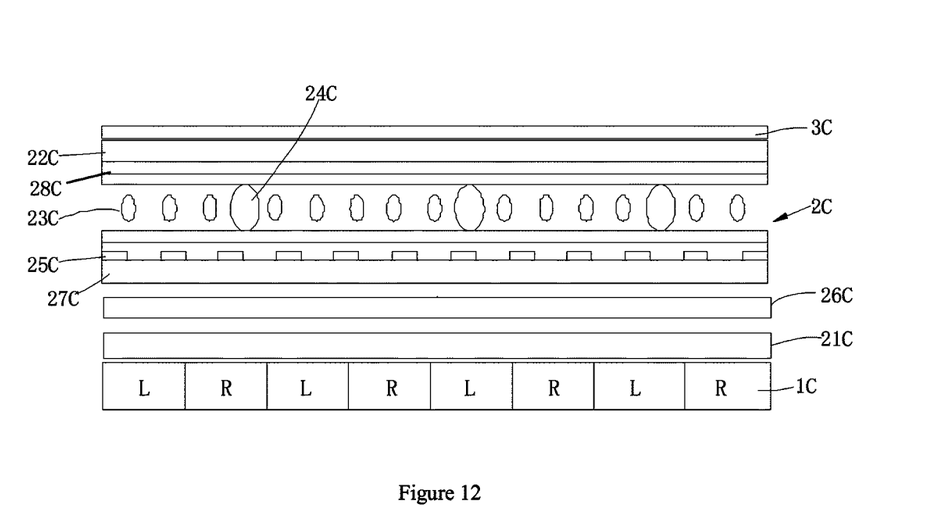
FIG. 12 illustrates another exemplary 2D/3D switchable stereoscopic display apparatus consistent with disclosed embodiments.

FIG. 12 illustrates another exemplary 2D/3D switchable stereoscopic display apparatus. As shown in FIG. 12, similar to FIG. 2, the 2D/3D switchable stereoscopic display apparatus includes a display panel 1C and a liquid crystal lens 2C disposed at the light-emitting side of the display panel 1C. The liquid crystal lens 2C includes a first substrate 21C and a second substrate 22C disposed opposite to each other, and the second substrate 22C is placed over the first substrate 21C. A liquid crystal layer having liquid crystal molecules 23C is placed between the first substrate 21C and the second substrate 22C, and spacers 24 is disposed between the first substrate 21C and the second substrate 22C to maintain the space between the first substrate 21C and the second substrate 22C for the liquid crystal molecules 23C.

Unlike the embodiments described above, the 2D/3D switchable stereoscopic display apparatus also includes a third electrode 26C provided between the first substrate 21C and the plurality of first electrodes 25C. An insulating layer 27C is placed between the first electrodes 25C and the third electrode 26C, and the plurality of first electrodes 25C is disposed on the insulating layer 27C.

When the 2D/3D switchable stereoscopic display apparatus is in the 2D display state, the control module controls the first voltage applied between the first substrate 21C and the second substrate 22C. The first voltage generates the first electric field with an equal or uniform electric field intensity. The first electric field drives the liquid crystal molecules 23C to rotate at a same degree, such that the refractive index difference between the liquid crystal molecules 23C and the spacers 24C is within the preset range. For example, the refractive index difference is considered as within the preset range if the difference between the refractive index of the liquid crystal molecules 23C and the refractive index of the spacers 24C is less than 0.1. At this time, the refractive index of the liquid crystal molecules 23C is substantially close to the refractive index of the spacers 24C.

Specifically, a fifth driving voltage is applied on the third electrode 26C, a sixth driving voltage is applied on the second electrode 28C, and the difference between the fifth driving voltage and the sixth driving voltage is the first voltage. The first voltage generates the first electric field with an equal or uniform electric field intensity between the first substrate 21C and the second substrate 22C. Under the effect of the first electric field, all the liquid crystal molecules 23C rotate at a same degree and have the same refractive index, and the refractive index difference between the liquid crystal molecules 23C and the spacers 24C is within the preset range. At this time, the refractive index of the liquid crystal molecules 23C is substantially close to the refractive index of the spacers 24C.

Thus, when the light emitted from the display panel 1C passes through the liquid crystal molecules 23C and the spacers 24C, the light is not substantially refracted (i.e., the light is not refracted or, even if the light is still refracted, the amount of refraction is negligible), solving the bright-spot problem of the spacers when the 2D/3D switchable stereoscopic display apparatus is in the 2D display state. Further, when the 2D/3D switchable stereoscopic display apparatus is in the 2D display state, the first electrodes 25C may be applied with driving voltage(s), or no driving voltage may be applied on the first electrodes 25C, without affecting the normal display of the 2D/3D switchable stereoscopic display apparatus.

Further, the third electrode 26C may include a plate electrode or a plurality of strip electrodes. When the third electrode 26C includes a plurality of strip electrodes, similar to the first electrodes 25C, the plurality of third electrodes 26C may be arranged in parallel with the plurality of first electrodes 25C. When the 2D/3D switchable stereoscopic display apparatus is in the 3D display state, a seventh driving voltage is applied on each of the plurality of first electrodes 25C, an eighth driving voltage is applied to the second electrode 28C, and a ninth driving voltage is applied on the third electrode 26C. These driving voltages can be configured in such a way to ensure the liquid crystal lens 2C display 3D images when the 2D/3D switchable stereoscopic display apparatus is in the 3D display state. For example, when in the 2D display state, the control module can control the ninth driving voltage on the third electrodes and the eighth driving voltage on the second electrode to control the first voltage as a difference between the ninth driving voltage and the eighth driving voltage; and when in the 3D display state, the driving voltage applied on the third electrode 26C may be adjusted to provide a separate electric field to adjust the overall rotation of the liquid crystal molecules such that the refractive index of the liquid crystal molecules above the spacers is substantially close to the refractive index of the spacers.

Figure 14:
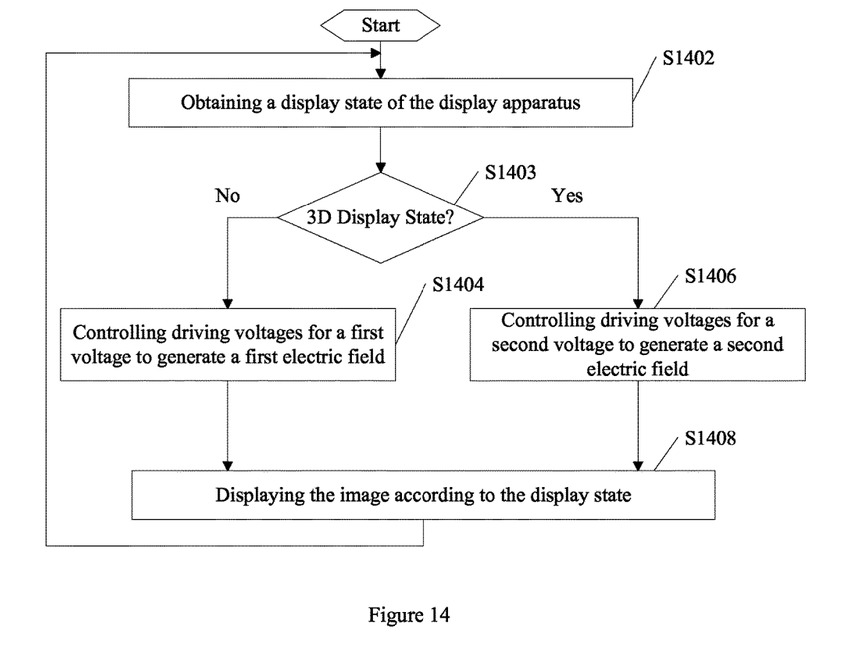
FIG. 14 illustrates an exemplary operation process of a control module consistent with disclosed embodiments.

Thus, according to various disclosed embodiments, the control module of the 2D/3D switchable stereoscopic display apparatus performs various processes to ensure that the 2D/3D switchable stereoscopic display apparatus can display normal 2D/3D images while reducing or eliminating the bright-spot phenomenon of the spacers. FIG. 14 illustrates an exemplary operational process of the control module.

As shown in FIG. 14, at the beginning of the operational process, the control module obtains a display state of the 2D/3D switchable stereoscopic display apparatus (S1402). The control module further determines whether the display state of the 2D/3D switchable stereoscopic display apparatus is a 3D display state (S1403).

If the control module determines that the display state of the 2D/3D switchable stereoscopic display apparatus is not in a 3D display state (S1403; No), the control module controls the driving voltages to the electrodes to generate a first voltage and a corresponding first electric field for the 2D display state (S1404), the details of which are described in previous embodiments.

If the control module determines that the display state of the 2D/3D switchable stereoscopic display apparatus is in a 3D display state (S1403; Yes), the control module controls the driving voltages to the electrodes to generate a second voltage and a corresponding second electric field for the 3D display state (S1406), the details of which are also described in previous embodiments.

Further, the control module may cause images displayed according to respective display state (S1408). For example, if a directional diffuser is configured, the control module may also control proper component to ensure the directional diffuser is used properly.

The above described embodiments are only for illustrative purposes. It should be noted that those skilled in the art, without departing from the principles of the present disclosure, may make certain improvements and modifications, and these improvements and modifications should also be considered within the scope of the disclosure.

Other applications, advantages, alternations, modifications, or equivalents to the disclosed embodiments are obvious to those skilled in the art.

What is claimed is:

1. A 2D/3D switchable stereoscopic display apparatus, comprising
   a display panel;
   a liquid crystal lens coupled with the display panel at a light-emitting side of the display panel, wherein the liquid crystal lens includes a first substrate having a plurality of first electrodes, a second substrate disposed opposite to the first substrate and having a second electrode, a liquid crystal layer constituting liquid crystal molecules disposed between the first substrate and the second substrate, and a plurality of spacers;
   a directional diffuser placed at a light-emitting side of the liquid crystal lens to diffuse light emitted from the liquid crystal lens, wherein the directional diffuser is arranged at an angle with the liquid crystal lens, and the angle is configured to allow the liquid crystal lens to emit light normally without affecting a 3D display effect, when the display apparatus is in a 3D display state; and
   a controller configured to, when the display apparatus is in a 2D display state, control a first voltage between the first electrodes and the second electrode to generate a first electric field with an equal electric field intensity, which causes the liquid crystal molecules to rotate by a predetermined degree such that a refractive index difference between the liquid crystal molecules and the spacers is within a preset range.

2. The display apparatus according to claim 1, wherein:
   the controller controls a first driving voltage on the first electrodes and a second driving voltage on the second electrode to control the first voltage as a difference between the first driving voltage and the second driving voltage.

3. The display apparatus according to claim 1, further including:
   a third electrode disposed between the first substrate and the first electrodes, wherein:
   an insulating layer is placed between the third electrode and the first electrodes, and the first electrodes are disposed on the insulating layer; and
   the controller controls a third driving voltage on the third electrodes and a fourth driving voltage on the second electrode to control the first voltage as a difference between the third driving voltage and the fourth driving voltage.

4. The display apparatus according to claim 1, wherein:
   the first voltage is greater than a threshold voltage of the liquid crystal molecules.

5. The display apparatus according to claim 4, wherein:
   provided that the threshold voltage of the liquid crystal molecules is denoted as $v_{th}$, and the first voltage is denoted as $u_0$, a relationship between the threshold voltage and the first voltage is: $1.5v_{th} \leq u_0 \leq 4v_{th}$.

6. The display apparatus according to claim 1, wherein the controller is further configured to:
   when the display apparatus is in the 3D display state, control a second voltage between the first electrodes and the second electrode to generate a second electric field with an unequal electric field intensity, which causes the liquid crystal molecules to rotate by different degree in gradient to form a plurality of liquid crystal lens units arranged in an array for 3D display.

7. The display apparatus according to claim 1, wherein:
   the angle $\alpha$ satisfies: $60° \leq \alpha \leq 120°$.

8. The display apparatus according to claim 7, wherein:
   the angle $\alpha$ is approximately $90°$.

9. A 2D/3D switchable stereoscopic display apparatus, comprising:
   a display panel;
   a liquid crystal lens coupled with the display panel at a light-emitting side of the display panel, wherein the liquid crystal lens includes a first substrate having a plurality of first electrodes, a second substrate disposed opposite to the first substrate and having a second electrode, a liquid crystal layer constituting liquid crystal molecules disposed between the first substrate and the second substrate, and a plurality of spacers;
   a directional diffuser placed at a light-emitting side of the liquid crystal lens to diffuse light emitted from the liquid crystal lens, and
   a control configured to, when the display apparatus is in a 2D display state, control a first voltage between the first electrodes and the second electrode to generate a first electric field with an equal electric field intensity, which causes the liquid crystal molecules to rotate by a predetermined degree such that a refractive index difference between the liquid crystal molecules and the spacers is within a preset range,
   wherein:
   the directional diffuser includes a first refraction layer and a second refraction layer covering the first refraction layer, and the first refraction layer includes a plurality of diffusion units.

10. The display apparatus according to claim 9, wherein:
    light-emitting positions on the liquid crystal lens are not at focal points of the diffusion units.

11. The display apparatus according to claim 10, wherein:
provided that a focal length of a diffusion unit is f, a distance between a corresponding light-emitting position is l, a relationship between the focal length and the distance is l≤0.5f or l>2f.

12. The display apparatus according to claim 11, wherein:
a cross-sectional shape of the diffusion units is a semicircle; and
a diameter d of the diffusion units is less than a diameter of the liquid crystal units.

13. The display apparatus according to claim 12, wherein:
the diameter d of the diffusion units is ⅓~⅔ of a diameter of the spacers.

14. The display apparatus according to claim 12, wherein:
a height of the directional diffuser is equal to a height of the diffusion units, and the height of the diffusion units satisfies $$h = f - \sqrt{f^2 - \left(\frac{d}{2}\right)^2}.$$

15. The display apparatus according to claim 14, wherein:
a refractive index of the first refraction layer is $N_1$, a refractive index of the second refraction layer is $N_2$, and a refractive index difference between the first refraction layer and the second refractive layer is $\Delta n = |N_1 - N_2| \geq 0.1$.

16. A method for a 2D/3D switchable stereoscopic display apparatus having a display panel, a controller, a liquid crystal lens coupled with the display panel at a light-emitting side of the display panel, and a directional diffuser placed at a light-emitting side of the liquid crystal lens to diffuse light emitted from the liquid crystal lens, wherein the liquid crystal lens includes a first substrate having a plurality of first electrodes, a second substrate disposed opposite to the first substrate and having a second electrode, a liquid crystal layer constituting liquid crystal molecules disposed between the first substrate and the second substrate, and a plurality of spacers, and wherein the directional diffuser is arranged at an angle with the liquid crystal lens, and the angle is configured to allow the liquid crystal lens to emit light normally without affecting a 3D display effect; the method comprising:
obtaining a display state of the display apparatus;
determining whether the display state is a 2D display state or a 3D display state;
when it is determined that the display state is a 2D display state, controlling a first voltage between the first electrodes and the second electrode to generate a first electric field with an equal electric field intensity, which causes the liquid crystal molecules to rotate by a predetermined degree such that a refractive index difference between the liquid crystal molecules and the spacers is within a preset range.

17. The method according to claim 16, wherein controlling the first voltage further includes:
controlling a first driving voltage on the first electrodes and a second driving voltage on the second electrode to control the first voltage as a difference between the first driving voltage and the second driving voltage.

18. The method according to claim 16, further including:
when it is determined that the display state is a 3D display state, controlling a second voltage between the first electrodes and the second electrode to generate a second electric field with an unequal electric field intensity, which causes the liquid crystal molecules to rotate by different degree in gradient to form a plurality of liquid crystal lens units arranged in an array for 3D display.

* * * * *